3,408,333
PRODUCTION OF SPINNABLE POLYESTERS

Karl Heinz Tiedtke, Grosse Fischerstrasse 21, Frankfurt am Main, Germany, and Hans Scheller, Auf dem Hugel 4, Schonberg, Taunus, Germany, and Werner Ilse, 48 Rue Demy Schlechter, Luxembourg, Luxembourg
No Drawing. Filed Apr. 13, 1965, Ser. No. 447,888
12 Claims. (Cl. 260—75)

ABSTRACT OF THE DISCLOSURE

The specification discloses use of metal thioantimonates or metal thioantimonites as catalysts in the production of a spinnable colorless polyester by the transesterification of a dialkyl terephthalate with an aliphatic glycol and subsequent polycondensation. The catalysts, such as sodium or zinc thioantimonates or thioantimonites, are useful for catalyzing either or both reactions.

---

This invention relates to the production of spinnable polyesters that are heat-stable.

Among the many methods of producing polyesters, one that is of considerable industrial importance is the production of polyethylene glycol terephthalate by the reaction of the dimethyl ester of terephthalic acid with ethylene glycol to form ethylene glycol terephthalate and its polycondensation to polyethylene glycol terephthalate. For performing both the primary transesterification reaction, also referred to as the preliminary condensation, and the polycondensation reaction, the use of various catalysts and catalyst systems for accelerating the reactions and for forming polyesters of higher molecular weights has already been proposed. The difficulties involved in finding suitable catalysts or catalyst systems for the production of high quality spinnable polyesters are very well known. They arise because the catalysts are required to be soluble both in the reaction system and in the finished polyesters, because they must be just as effective for catalysing the preliminary condensation and the polycondensation reactions and also because they should permit colourless, thermally stable polycondensation products to be obtained. These requirements are not all fully satisfied by previously proposed types of catalyst and previously prepared polycondensates of high molecular weight tend to have a more or less pronounced yellow tint. These undesirable discolorations are due to the decomposition of the catalysts that are introduced, to their natural colour or to their tendency to form decomposition products during the condensation reactions.

According to the present invention there is provided in the production of a spinnable colourless polyester by the transesterification of a dialkyl terephthalate with an aliphatic glycol and subsequent polycondensation of the resulting product in the presence of a catalyst, the characteristic step of using a catalyst selected from the group consisting of metal thioantimonates or metal thioantimonites.

Particularly suitable catalysts for the purpose of the invention are sodium thioantimonate $Na_3SbS_4 \cdot 9H_2O$ which is also known as Schlippe's salt, zinc thioantimonate, and sodium thioantimonite. When a thioantimonate, such as sodium thioantimonate was tested for its catalytic effectiveness, it was unexpectedly found that it would simultaneously catalyse the transesterification as well as the polycondensation reaction and that a crystallized polyethylene terephthalate of hitherto unattained whiteness could thus be obtained. The intrinsic viscosities obtained were in the region of 0.5 to 1.0, but depend specifically upon the reaction conditions. If sodium thioantimonate is used, its excellent solubility in ethylene glycol, which is about 20% by weight, is a considerable advantage. Antimony trioxide which has been principally used because it catalyses the polycondensation reaction particularly well cannot be used otherwise than in suspension and in view of its low reaction velocity constants it is incapable of catalysing the transesterification reaction at the desired rate.

On the other hand, when sodium thioantimonate is employed both the transesterification and the polycondensation reactions are catalysed. At the temperature of the transesterification of the mixture of dimethyl terephthalate and ethylene glycol, which temperature rises from about 150 to 250° C., the slightly yellowish sodium thioantimonate experiences a change which reveals itself as a change of colour. At 150° C., transesterification begins and the reaction mixture turns red and cloudy. If titanium dioxide is simultaneously added transesterification may even begin at 125° C.

At a temperature between about 180° C. and 200° C. the cloudiness of the reaction mixture disappears and the colour changes to a yellowish-green. Towards the end of the transesterification reaction, a colourless melt remains. The volatile sulphur compounds which form during transesterification escape, or they may be bound in the transesterification mixture by an addition of suitable metal compounds.

The present catalysts are preferably added to the initial reactants of the preliminary condensation reaction, i.e. to the mixture of dimethyl terephthalate and ethylene glycol. However, if the production of the polyesters is directly based on the use of the prepared ethylene glycol terephthalate then they may be added to the latter for catalysing the polycondensation reaction. The catalyst concentration should be between about 0.05 and 0.5% by weight related to the quantity of ethylene glycol terephthalate that is introduced or that is to be formed.

Transesterification proceeds in a manner known to the art at temperatures between about 160 and 240° C., the methanol that is formed being removed continuously. Polycondensation is likewise performed in conventional manner at temperatures between 260 and 280° C., preferably between 270 and 275° C., in the best possible vacuum whilst flushing with nitrogen and carefully removing the liberated ethylene glycol in order to avoid any possible back reaction.

The method proposed by the invention will now be exemplified by descriptions of a number of examples. In these examples the intrinsic viscosity was determined in solution in a mixture of tetrachloroethane and phenol (40:60) at 20° C., whereas the measurement of temperature stability was deduced from the viscosity drop after 18 hours tempering at 205° C.

Example 1

100 g. of dimethylterephthalate were transesterified with 70 g. of ethylene glycol and 0.12 g. of a commercial sodium thioantimonate at a rising temperature in the course of 3 hours. The final temperature in the sump was 250° C. Whilst the temperature of the bath was kept at 280° C., the mixture was stirred for half an hour under nitrogen. The major proportion of the ethylene glycol was thus distilled off. The polycondensation reaction was then completed in a rising vacuum of 0.4 to 0.01 mm. Hg in 2 hours.

The final viscosity obtained was $\eta_{rel}$ ---------------------------------- 1.42
$\eta_{intr}$ ---------------------------------- 0.92
M.P. ---------------------------- ° C.-- 254–256

The material was submitted to a high temperature test at 205° C. for 3 hours whereupon the viscosity was $\eta_{rel}$ ------------------------------------------- 1.36
$\eta_{intr}$ ------------------------------------------- 0.80

Example 2

150 g. of dimethyl terephthalate were transesterified with 105 g. of ethylene glycol and 0.18 g. of a commercial sodium thioantimonate at a rising temperature in the course of 3.5 hours. The final temperature in the sump was 232° C. Whilst the temperature of the bath was kept at 280° C. the mixture was stirred for half an hour under nitrogen, causing the greater proportion of the ethylene glycol to distil off. The polycondensation reaction was then completed in a falling vacuum of 0.6 to 0.05 mm. Hg in 3.75 hours.

The final viscosity was $\eta_{rel}$ ------------------------------------------- 1.34
$\eta_{intr}$ ------------------------------------------- 0.76
M.P. ---------------------------------------° C-- 248-251

The material was then submitted to a high temperature test at 205° C. for 18 hours and the viscosity was $\eta_{rel}$ ------------------------------------------- 1.24
$\eta_{intr}$ ------------------------------------------- 0.55

Example 3

150 g. of dimethyl terephthalate were transesterified with 105 g. of ethylene glycol and 0.18 g. of a commercial sodium thioantimonate at a rising temperature in the course of 5 hours. The final temperature of the sump was 233° C. The mixture was stirred for half an hour under nitrogen whilst the bath temperature was kept at 280° C., causing the greater proportion of the ethylene glycol to distil off. The polycondensation reaction was completed in a falling vacuum of 0.4–0.05 mm. Hg in 4.5 hours.

The final viscosity was $\eta_{rel}$ ------------------------------------------- 1.27
$\eta_{intr}$ ------------------------------------------- 0.66

The material was spun at 300° C. and the viscosity of the fibre was found to be $\eta_{rel}$ ------------------------------------------- 1.25
$\eta_{intr}$ ------------------------------------------- 0.58

Finally the spun fibres were submitted to a high temperature test at 205° C. for 18 hours and the viscosity was $\eta_{rel}$ ------------------------------------------- 1.26
$\eta_{intr}$ ------------------------------------------- 0.60

Example 4

100 g. of dimethyl terephthalate were transesterified with 70 g. of ethylene glycol and 0.18 g. of purified sodium thioantimonate at a rising temperature in the course of 2.25 hours. The final temperature of the sump was 242° C. Whilst the bath temperature was kept at 280° C., the mixture was stirred for half an hour in a nitrogen atmosphere, causing the greater proportion of the ethylene glycol to distil off. The polycondensation reaction was then completed in a falling vacuum of 1.5 to 0.05 mm. Hg in 1.5 hours.

The final viscosity was $\eta_{rel}$ ------------------------------------------- 1.31
$\eta_{intr}$ ------------------------------------------- 0.70
M.P. ---------------------------------------° C-- 260-262

Example 5

100 g. of dimethyl terephthalate were transesterified with 70 g. of ethylene glycol and 0.175 g. of zinc thioantimonate at a rising temperature in the course of 4 hours. The final temperature of the sump was 230° C. Whilst the bath temperature was kept at 280° C., the mixture was stirred for half an hour in a nitrogen atmosphere, causing the major proportion of the ethylene glycol to distil off. The polycondensation reaction was completed in a rising vacuum of 0.6 to 1.5 mm. Hg in 0.5 hour.

The final viscosity was $\eta_{rel}$ ------------------------------------------- 1.28
$\eta_{intr}$ ------------------------------------------- 0.64
M.P. ---------------------------------------° C-- 256-259

Example 6

100 g. of dimethyl terephthalate were transesterified with 70 g. of ethylene glycol and 0.175 g. of zinc thioantimonate at a rising temperature in the course of 4.25 hours. The final temperature of the sump was 224° C. Whilst the bath temperature was kept at 280° C. the mixture was stirred for half an hour under nitrogen, causing the major proportion of the ethylene glycol to distil off. The polycondensation reaction was completed in a falling vacuum of 1.0 to 0.2 mm. Hg in 0.75 hour.

The final viscosity was $\eta_{rel}$ ------------------------------------------- 1.35
$\eta_{intr}$ ------------------------------------------- 0.78
M.P. ---------------------------------------° C-- 259-261

Example 7

83 g. of terephthalic acid were transesterified with 105 g. of ethylene glycol and 0.12 g. of purified sodium thioantimonate at a rising temperature in the course of 8 hours. The final temperature of the sump was 210° C. Whilst the temperature of the bath was kept at 280° C., the mixture was stirred for half an hour under nitrogen, causing the major proportion of the ethylene glycol to distil off. The polycondensation reaction was then completed in a falling vacuum of 0.8 to 0.1 mm. Hg in 2.75 hours.

The final viscosity was $\eta_{rel}$ ------------------------------------------- 1.33
$\eta_{intr}$ ------------------------------------------- 0.74
M.P. ---------------------------------------° C-- 255-257

Example 8

100 g. of dimethyl terephthalate were transesterified with 70 g. of ethylene glycol, 0.05 g. of zinc acetate and 0.12 g. of sodium thioantimonate at a rising temperature in the course of 1.5 hours. Whilst the temperature of the bath was kept at 280° C., the mixture was stirred for half an hour under nitrogen, causing the major proportion of the ethylene glycol to distil off. The polycondensation reaction was then completed in a falling vacuum of 1.5 to 0.1 mm. Hg in 1.5 hours.

The final viscosity was $\eta_{rel}$ ------------------------------------------- 1.34
$\eta_{intr}$ ------------------------------------------- 0.76
M.P. ---------------------------------------° C-- 258-259

Example 9

100 g. of dimethyl terephthalate were transesterified with 70 g. of ethylene glycol, 0.1 g. of triphenoxyantimony and 0.12 g. of recrystallised sodium thioantimonate at a rising temperature in the course of 2.25 hours. The final temperature of the sump was 240° C. Whilst the bath temperature was kept at 280° C., the mixture was stirred for half an hour under nitrogen, causing the major proportion of the ethylene glycol to distil off. The polycondensation reaction was then completed in a falling vacuum of 1.0 to 0.1 mm. Hg in 2 hours.

The final viscosity was $\eta_{rel}$ ------------------------------------------- 1.26
$\eta_{intr}$ ------------------------------------------- 0.60
M.P. ---------------------------------------° C-- 259-261

Example 10

100 g. of dimethyl terephthalate were transesterified with 70 g. of ethylene glycol, 0.091 g. of zinc-2-mercaptobenzimidazole and 0.12 g. of recrystallised sodium thioantimonate at a rising temperature in the course of 1.75 hours. The final temperature of the sump was 243° C. Whilst the temperature of the bath was kept at 280° C., the mixture was stirred under nitrogen for half an hour, causing the major proportion of the ethylene glycol to distil off. The polycondensation reaction was then completed in a falling vacuum of 1.0 to 0.1 mm. Hg in 1.5 hours.

The final viscosity was

| | |
|---|---|
| $\eta_{rel}$ | 1.28 |
| $\eta_{intr}$ | 0.66 |
| M.P. | ° C__ 257–259 |

Example 11

100 g. of dimethyl terephthalate were transesterified with 70 g. of ethylene glycol, 0.062 g. of zinc-di-naphthol and 0.12 g. of recrystallised sodium thioantimonate at a rising temperature in the course of 1.75 hours. The final temperature of the sump was 240° C. Whilst the temperature of the bath was kept at 280° C., the mixture was stirred under nitrogen for half an hour, causing the major proportion of the ethylene glycol to distil off. The polycondensation reaction was then completed in a falling vacuum of 0.6 to 0.1 mm. Hg in 0.75 hour.

The final viscosity was

| | |
|---|---|
| $\eta_{rel}$ | 1.27 |
| $\eta_{intr}$ | 0.62 |
| M.P. | ° C__ 257–259 |

Example 12

194 g. of dimethyl terephthalate were transesterified with 136.4 g. of ethylene glycol and 0.21 g. of sodium thioantimonite at a rising temperature for 1.75 hours until all the methanol had been split off. After the mixture had been stirred under nitrogen for a quarter of an hour at a bath temperature of 280° C., causing the major proportion of the ethylene glycol to distil off, the polycondensation reaction was completed in a falling vacuum of 2 to 0.9 mm. Hg in 1.25 hours. The resulting colourless polyester had a viscosity of

| | |
|---|---|
| $\eta_{rel}$ | 1.30 |
| $\eta_{intr}$ | 0.68 | and melted at M.P. 255–258° C.

We claim:
1. A process for producing a polyester comprising
   (a) transesterifying a dialkyl terephthalate with an aliphatic glycol in the presence of a catalyst selected from sodium thioantimonate, zinc thioantimonate, and sodium thioantimonite, to form a transesterification product, and
   (b) polycondensing said product.
2. A process as in claim 1, wherein said dialkyl terephthalate is dimethyl terephthalate, and said glycol is ethylene glycol.
3. A process as in claim 1, wherein said transesterifying step occurs in the presence of sulfur-binding metal compounds.
4. A process as in claim 1, wherein said transesterifying step occurs in the presence of metal compounds selected from titanium dioxide, zinc acetate, triphenoxy antimony, zinc-2-mercapto-benzimidazole, and zinc-di-naphthol.
5. A process as in claim 1, wherein said catalyst is used in a concentration of from about 0.05 to 0.5% by weight with respect to the glycol terephthalate to be formed.
6. A process as in claim 1, wherein said polycondensation occurs in the presence of a catalyst selected from sodium thioantimonate, zinc thioantimonate, and sodium thioantimonite.
7. A process for producing a polyester from the transesterification product of a dialkyl terephthalate with an aliphatic glycol comprising
   (a) polycondensing said product in the presence of a catalyst selected from sodium thioantimonate, zinc thioantimonate, and sodium thioantimonite.
8. A process as in claim 7, wherein said dialkylterephthalate is demthyl terephthalate and said glycol is ethylene glycol.
9. A process as in claim 7, wherein said polycondensation step occurs in the presence of sulfur-binding metal compounds.
10. A process as in claim 7, wherein said polycondensation step occurs in the presence of metal compounds selected from titanium dioxide, zinc acetate, triphenoxy antimony, zinc-2-mercapto-benzimidazole, and zinc-di-naphthol.
11. A process as in claim 7, wherein said catalyst is used in a concentration of from about 0.05 to 0.5% by weight with respect to said transesterification product.
12. A method of producing a polyester comprising the steps of mixing dimethyl terephthalate, ethylene glycol and a catalyst selected from sodium thioantimonate, zinc thioantimonate and sodium thioantimonite present in a concentration of from about 0.05 to 0.5% by weight with respect to the glycol terephthalate to be formed, transesterifying said mixture at a temperature between 160 and 240° C., continually removing the resulting methanol, polycondensing the reaction product of said transesterification at a temperature between 260 and 280° C., under reduced pressure with the exclusion of air, and removing ethylene glycol which is split off during the polycondensation.

References Cited

UNITED STATES PATENTS

| | | | |
|---|---|---|---|
| 3,057,828 | 10/1962 | McNeil | 260—75 |
| 3,073,801 | 1/1963 | Siggel et al. | 260—75 |
| 2,465,319 | 3/1949 | Whinfield | 260—75 |

WILLIAM H. SHORT, *Primary Examiner.*

LOUISE P. QUAST, *Assistant Examiner.*